June 20, 1961     A. J. CERTA     2,988,853
GLASS-TO-METAL SEAL
Filed Aug. 16, 1957

INVENTOR.
ANTHONY J. CERTA
BY
AGENT

United States Patent Office 2,988,853
Patented June 20, 1961

2,988,853
GLASS-TO-METAL SEAL
Anthony J. Certa, Norristown, Pa., assignor to Philco Corporation, Philadelphia, Pa., a corporation of Pennsylvania
Filed Aug. 16, 1957, Ser. No. 678,565
2 Claims. (Cl. 49—81)

This invention relates generally to the art of making glass-to-metal seals and more particularly to a unique method of oxidizing nickel to produce an effective glass-to-nickel seal, and to the article of manufacture produced by such method.

While of broader applicability this invention is especially useful in the making of semiconductor devices, such as transistors.

The field relating to the production of glass-to-metal seals is highly developed and one of rapidly increasing import, having extensive application in electronics and related industries. Notwithstanding the intense activity in this field and a present latitude in choice of suitable glasses and metals to produce the type of seal desired, there has been no adequate technique for producing an effective glass-to-nickel seal.

It is general knowledge that there is an affinity between the oxides of certain metals and glass and that, in particular instances, to insure good adherence between the glass and metal, it is necessary that an oxide film be formed on the surface of the metal to act as a bonding bridge between the glass and metal substrate, the oxide, during sealing, undergoing partial dissolution in the molten glass, an occurrence referred to as "wetting." However, previous attempts to form a reliable airtight seal between nickel and glass have been unsuccessful. This lack of success has been due, primarily, to the inability of prior art methods to produce an oxide of nickel sufficiently adherent to the nickel substrate, there being a tendency, at the temperatures normally employed in effecting glass-to-metal seals, for the oxide of nickel to become detached at the nickel-oxide interface, a condition apparently induced by the difference in expansion between the oxide and the parent metal.

Nickel, because of its highly porous structure readily occludes air and characteristically produces a gassy seal. This problem, which manifests itself in some degree in numerous metals, can usually be alleviated by preheating the metal in a vacuum or in a protective atmosphere. Paradoxically, however, in the case of nickel, heating at elevated temperatures serves to disrupt the sheath of oxide formed on the surface of the body of nickel, which film is indispensable to the proper bonding of the glass to the nickel.

It is consequently a primary objective of this invention to provide a method of producing an effective hermetic glass-to-nickel seal.

Another and equally important object of this invention is to provide a method of oxidizing nickel which will produce a strongly adherent film of oxide on the surface of the nickel and one which is relatively undisturbed by temperatures normally employed in the glassing process, in addition to being readily wetted by refractory glasses and other vitreous materials.

A subordinate object of this invention is to provide a simple, inexpensive method for obtaining the desired film of oxide on the surface of a body of nickel.

It is a still further object to provide a non gassy, hermetic glass-to-nickel seal.

The term oxide as used herein, for reasons hereinafter stated, is to be broadly construed and is to be understood as encompassing such compounds and intermixtures of nickel as result from the practice of the method steps of this invention, and does not necessarily refer to a specific compound.

Other objects and features of this invention will become more apparent from the following detailed description and the accompanying drawing in which.

In essence, the method of this invention comprises heating the body of nickel in an oxidizing atmosphere to a temperature lying in the range from about 1000° C., as a lower limit, to a value just under the melting point of nickel, as a higher limit, maintaining the body of nickel at this elevated temperature for a predetermined length of time, dependent for example upon the thickness of oxide desired, and then cooling said body in such manner as to prevent further oxidation, this being desirably accomplished by rapid cooling, as by liquid quenching. In one aspect of the invention, however, further oxidation of the nickel is prevented by simply allowing the heated body of nickel to cool slowly in an inert atmosphere such as gaseous nitrogen.

I have found that if these method steps are followed, the sheath of oxide formed on the surface of the nickel is tenaciously adherent to the base metal. The oxide, moreover, is readily wetted by ceramic or vitric materials, thereby providing the heretofore unattainable bonding bridge between such materials and nickel. As illustrative of the invention, but in no way limitative thereof, reference is made to the fabrication of transistors of the type employing an eyelet stem assembly to effect hermetic closure of the main transistor enclosing structure.

Figure 1:
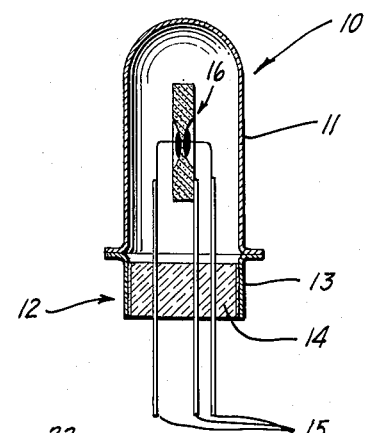
FIGURE 1 depicts an encapsulated transistor embodying seals made in accordance with the technique of the present invention.

Detailed reference is now made to FIGURE 1 of the drawing illustrating an enlarged sectional view of a conventional transistor 10, the unit including the housing or can 11, hermetically sealed by the stem assembly 12. This latter assembly consists of the eyelet 13, insulating core 14 and lead-in wires 15, all of the elements being hermetically bonded to the vitric core 14.

In the fabrication of semiconductor devices of the type shown, it has generally been found necessary to hermetically encapsulate the semiconductor 16, the encapsulation being most desirably accomplished, for reason hereinafter set out, by joining the can 11 and eyelet 13 by a cold welding technique.

In many applications, the can in order to resist corrosion is made of nickel, and while it is highly advantageous to also make the eyelet 13 of nickel, in order to facilitate the cold welding of these members, it has heretofore been impractical because of prior art limitations in forming an effective bond between the nickel eyelet 13 and the insulating vitric core 14.

Methods other than cold welding for effecting juncture of the eyelet and can, such as resistance welding, often result in the release of metal vapors which seriously contaminate the semiconductor and associated elements, and additionally produce damaging thermal gradients which, if not carefully controlled, can deleteriously affect the delicate transistor assembly.

Soldering techniques, while not producing contaminants of the nature mentioned above, fail to provide an hermetic seal which will remain reliable under the extreme environmental conditions to which these units are customarily subjected. Means permitting the highly desirable use of nickel to facilitate the desired cold welding of the transistor encapsulating members have consequently been the subject of considerable investigation. The method teachings of this invention solve the presently existing impasse by enabling vitric materials, such as glass, to be hermetically sealed to nickel through the intermediary of a readily wetted, tenaciously adherent, film of oxide formed on the surface of the parent metal.

Current developments in the transistor field indicate a still further advantageous use of nickel in connection with plug-in type units. It is desirable in such cases to employ transistor lead-in wires having low lead fatigue, or, put conversely, having high resistance to fatigue induced by bending. Metals normally used, such as Dumet or Kovar, are poor in this regard and are consequently undesirable in such applications. The mechanical properties of nickel, however, are considerably superior to those of the aforementioned metals and additionally provide the desired electrical conductivity, thereby proving to be ideally suited for use in plug-in type units. This advantageous use of nickel has also been made possible by this invention by enabling the lead-in wires 15 to be hermetically joined to the glass insulating core 14.

To facilitate a clearer understanding of the method of obtaining the desired form of oxide and of producing an effective glass-to-metal seal, a specific application setting forth the various method steps relating to the treatment of the transistor eyelet 13 is described below.

Figure 2:
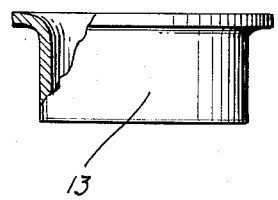
FIGURE 2 is an enlarged fragmentary showing of a transistor stem eyelet, of the type shown in FIG. 1, before undergoing treatment in accordance with the method steps of this invention.

The stem eyelet 13, shown in FIG. 2, is made of nickel, or a high nickel alloy, which, for most effective treatment, is first surface-cleaned by using trichlorethylene or other suitable reagents. This step is desirably followed by a bright dip which removes any latent oxide film from the parts. A typical bright dip composition may be made by using 1125 ml. of $HNO_3$, 750 ml. of $H_2SO_4$ and 500 ml. of $H_2O$, to which 6 grams of NaCl are added per liter of solution. In lieu of the bright dip, the parts may be fired in a hydrogen atmosphere at approximately 900 degrees to insure the removal of undesirable oxides. Any of numerous commercially recognized techniques, of which the above are exemplary, may be employed to obtain a body of nickel substantially free of surface contaminants. This step, while not indispensable to the method teachings of the invention, is highly desirable if consistently satisfactory results are to be obtained.

Figure 3:
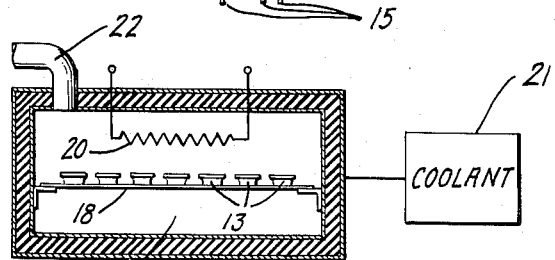
FIGURE 3 is a somewhat diagrammatic illustration of one form of apparatus adapted for use in carrying out the method steps of this invention.

The eyelet 13, after cleaning is then heated in any suitable manner as by being placed in the oven 17 shown in FIG. 3. To facilitate mass production of these units a plurality of eyelets are positioned on a suitable support 18 located within the oven enclosure 19. The oven is then heated to prescribed temperature by energization of the resistive element 20. Experimentation has established the fact that it is necessary to fire the parts undergoing oxidation to a temperature at least in the region of 1000° C. in order to obtain a consistently adherent, wettable oxide film, and preferably above 1050° C. Desirably the parts are maintained at this elevated temperature for several minutes, the time, however, is not critical and is best determined by experimentation. It was found, for example, that excellent seals could be made to a nickel eyelet formed of 15 mil stock having an over-all length of 100 mils and an inside diameter of 150 mils by heating the eyelet for six minutes at a temperature of 1050° C., or for three minutes at a temperature of 1075° C. Equally effective results were obtained however by varying the temperature and fixing the time at some nominal figure such as 10 minutes. It should be nonetheless recognized that the temperature must be no lower than the minimum level specified above and that there is a certain time in which optimum results can be attained. This time, as indicated previously, can best be determined by experimentation. Importantly the cooling of the eyelets is accomplished in a manner preventing further oxidation, as for example by quenching in water, borating solution or even "quenching" in a "bath" of copper pellets. As previously suggested further undesirable oxidation of the eyelets, may be prevented by flushing the oven enclosure 19 with gaseous nitrogen pumped in through the conduit 22, the eyelets being left within the gas filled enclosure to cool slowly, the oxide formed by this latter method being equally as satisfactory as that resulting from rapid cooling. The rapid temperature reduction referred to above may be accomplished using any number of materials, the wide choice of suitable materials making it clear that the ultimately resulting oxide formation is not brought about as a result of chemical reaction between the nickel and some constituent found in the "quenching" media. Equally satisfactory results were obtained, for example, using water, glycerol, acetone, mineral oil, or borating solution, these materials being merely illustrative of the types of quenches available and in no way restrictive thereof.

A body of nickel oxidized in accordance with the method steps of this invention exhibits a sheath of oxide having a color from gray-green to green. In general, nickel oxidizes to either monoxide or dioxide, each of these materials being susceptible to analysis by chemical means. The oxide formed by the disclosed process, however, does not yield to either the monoxide or dioxide tests, the resulting material being possibly an intimate admixture of both forms of oxide.

Figure 4:
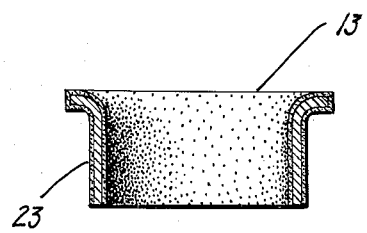
FIGURE 4 shows the transistor stem eyelet depicted in FIGURE 2 after having been treated, in accordance with the method steps of this invention.

Tests utilizing X-ray diffraction techniques likewise failed to disclose the composition of this complex oxide, and while considerable effort has been made to ascertain the precise composition of this material, the exact constituency of the oxide is at present unknown. From all appearances, the coating on the surface of the nickel is believed to be of non-stoichiometric composition comprising an admixture of various nickel oxides. The eyelets after having been treated in accordance with the method steps of this invention have the general appearance depicted in FIGURE 4, all external surfaces of the eyelet being covered with a relatively thick greenish oxide 23.

The temperature at which this oxide is formed brings about the expulsion of any gas occluded by the metal, no reabsorption of gases occurring after formation of this unique oxide sheath, the sheath evidently forming an impenetrable gas barrier preventing the occlusion of air on subsequent cooling of the metal.

Figure 5:
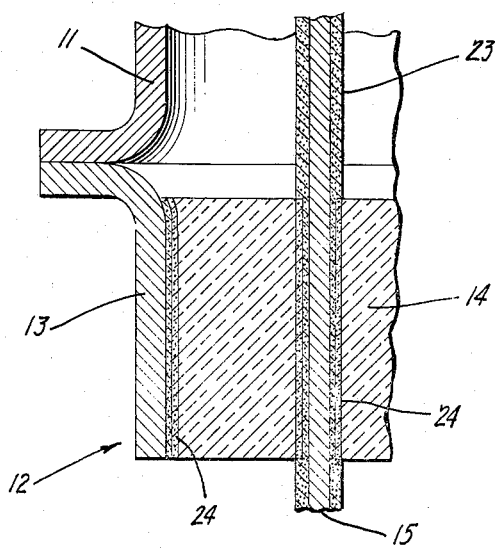
FIGURE 5 is an enlarged fragmentary showing of the completed transistor stem assembly depicting the hermetic sealing of the stem eyelet and lead wires.

The nickel lead-in wires 15 are oxidized in a manner similar to that employed in the oxidation of the eyelets 13. These parts are then hermetically sealed within the core matrix as shown most clearly in FIGURE 5, the fabrication being desirably accomplished in accordance with the method disclosed and claimed in the copending application of Henry P. Beerman and Ford K. Clarke, bearing Serial No. 654,907 filed April 24, 1957, and assigned to the assignee of the present invention. This method, briefly described, consists of compacting fusible insulating material, such as Dow Corning G–12, in granulated form, whose composition was known prior to the present invention and having an oxide composition approximating that set out below, around the leads 15 disposed in oriented relation within the eyelet 13, the technique resulting in a mechanical integration of the particles and serving to produce sufficiently intimate contact between the leads and core material to effect, on subsequent heating to a temperature in the region of approximately 900° C., hermetic juncture of the constituent parts. The resulting seal has a bubble-free interface of generally greenish appearance. During the glassing phase the oxide undergoes partial dissolution in the glass core, this being graphically illustrated in FIGURE 5 where, due to the exaggerated scale employed, that portion of the oxide sheath 23 which confronts the core, namely, the portion 24, can be seen dissolved in the vitric core 14. The oxide coating on the remaining surfaces of the eyelet has not been shown for purpose of clarification.

*Prior art oxide composition of a representative Corning G–12 glass*

| SiO$_2$ | PbO | Al$_2$O$_3$ | CaO | Na$_2$O | K$_2$O | MgO |
|---|---|---|---|---|---|---|
| 56.7 | 29.5 | 1.4 | 0.1 | 4.2 | 8.0 | 0.1 |

Summarized, the invention from a method aspect comprises oxidizing a body of nickel by heating to a temperature of approximately 1000° C. and then retaining the desired oxide thus formed by cooling in such a manner as to prevent further change in the oxide formation. This latter step can be accomplished by either cooling the nickel rapidly enough to inhibit the formation of further oxide or by allowing the nickel to cool in an inert atmosphere thereby preventing further oxidation. Both techniques have proved effective and while the precise theory underlying this invention is not fully understood, it is believed that the above discussion is explicatory of what has been established experimentally.

Notwithstanding the fact that the glass seals are made at temperatures below that normally required for adequate degassing of the base metal, the seals are excellent. It will consequently be recognized that this invention not only makes possible effective glass-to-nickel seals, but materially facilitates the fabrication procedure by reducing the temperature requirements necessary during glassing.

While preferred practice, illustrative of the method and apparatus concepts of the present invention, has been depicted and described, it will be understood by those skilled in the art that the invention is susceptible to changes and modifications without departing from the essential concepts thereof, and that such changes and modifications are contemplated as come within the scope of the appended claims.

I claim:

1. In the manufacture of stems for hermetically sealed semiconductor devices, of the type including a nickel ferrule housing an insulating core of vitric material, the method which comprises: elevating the temperature of said ferrule in an oxidizing atmosphere to a value lying in the range above approximately 1000° C. but below the melting point of nickel; maintaining said ferrule in said elevated temperature range for a period of time sufficient to produce a layer of oxide of predetermined thickness; liquid quenching said ferrule to cool it in a manner preventing further oxidation; and thereafter completing the stem assembly by hermetically joining said vitric core to said cooled ferrule.

2. The method of fabricating glass-to-nickel seals, which comprises: heating a body of nickel in an oxidizing atmosphere to a temperature lying in the range above approximately 1000° C. but below the melting point of nickel; maintaining said body within said elevated temperature range for a period of time sufficient to produce an oxide layer of predetermined thickness; quenching said body to cool it in a non-oxidizing environment; and thereafter forming a glass to nickel seal.

References Cited in the file of this patent

UNITED STATES PATENTS

| | | |
|---|---|---|
| 1,823,179 | Wentz | Sept. 15, 1931 |
| 1,901,563 | Martin | Mar. 14, 1933 |
| 1,955,564 | Rupp | Apr. 17, 1934 |
| 2,010,145 | Eitel | Aug. 6, 1935 |
| 2,103,610 | Burden et al. | Dec. 28, 1937 |
| 2,148,664 | Wille et al. | Feb. 28, 1939 |
| 2,193,640 | Navias | Mar. 12, 1940 |
| 2,206,392 | Crocker et al. | July 2, 1940 |
| 2,266,117 | Crocker et al. | Dec. 16, 1941 |
| 2,371,627 | Kingston | Mar. 20, 1945 |
| 2,422,628 | McCarthy | June 17, 1947 |
| 2,446,277 | Gordon | Aug. 3, 1948 |
| 2,461,935 | Clent et al. | Feb. 15, 1949 |
| 2,513,302 | Feild | July 4, 1950 |
| 2,584,354 | Kissinger et al. | Feb. 5, 1952 |
| 2,709,145 | Bucknall | May 24, 1955 |
| 2,743,553 | Armistead | May 1, 1956 |

FOREIGN PATENTS

| | | |
|---|---|---|
| 589,881 | Great Britain | July 2, 1947 |